Oct. 21, 1930. G. JACOBS Re. 17,835

SIGNAL

Original Filed Aug. 26, 1922 2 Sheets-Sheet 1

Inventor

George Jacobs

By Francis D. Hardesty

Attorney

Oct. 21, 1930. G. JACOBS Re. 17,835

SIGNAL

Original Filed Aug. 26, 1922 2 Sheets-Sheet 2

Inventor

George Jacobs

By Francis D. Hardisty

Attorney

Reissued Oct. 21, 1930

Re. 17,835

UNITED STATES PATENT OFFICE

GEORGE JACOBS, OF DETROIT, MICHIGAN

SIGNAL

Original No. 1,557,292, dated October 13, 1925, Serial No. 584,400, filed August 26, 1922. Application for reissue filed February 28, 1927. Serial No. 171,647.

This invention relates to means for making and breaking the electric circuit to a signal lamp, particularly to the tail light of a motor vehicle at each actuation of a movable member such as the brake pedal of the vehicle, and its object is to provide a simple and effective mechanism of this character which will interrupt such circuit at predetermined intervals, irrespectively of the distance the actuating member is moved.

So called "stop" lights are now on the market adapted to be mounted on the rear ends of motor vehicles to signal drivers in the rear that the vehicles equipped with such lamps are to slow down or stop. These lamps are usually in addition to the regular tail lamps of the vehicle. The present device is intended to use the tail light as a "stop" light by causing it to flash during either day or night frequently and rapidly at each actuation of the brake or clutch pedal so as to notify those in the rear of such actuation.

Figure 3:
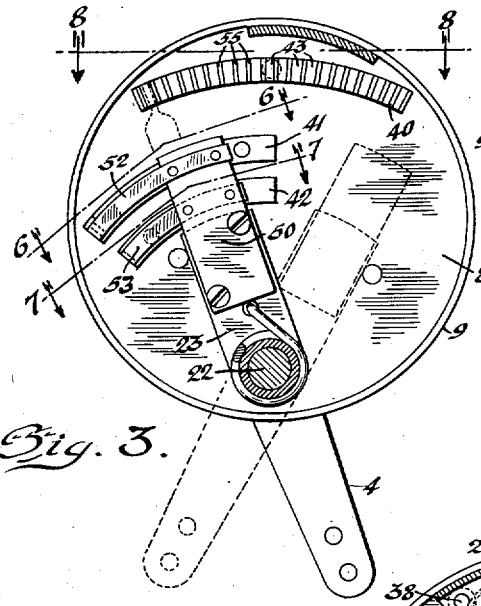
Figs. 3 and 4 are sections on the line 3—3 of Fig. 2 taken in opposite directions.
Figure 6:
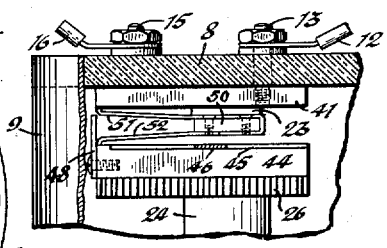
Figure 7:
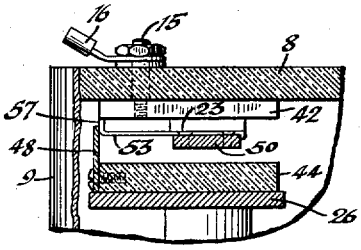
Figure 8:
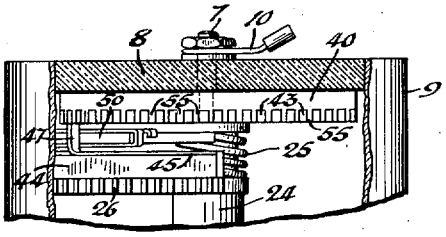

Figs. 6, 7 and 8 are sections on the lines 6—6, 7—7 and 8—8 of Fig. 3.

Similar reference characters refer to like parts throughout the several views.

Figure 1:
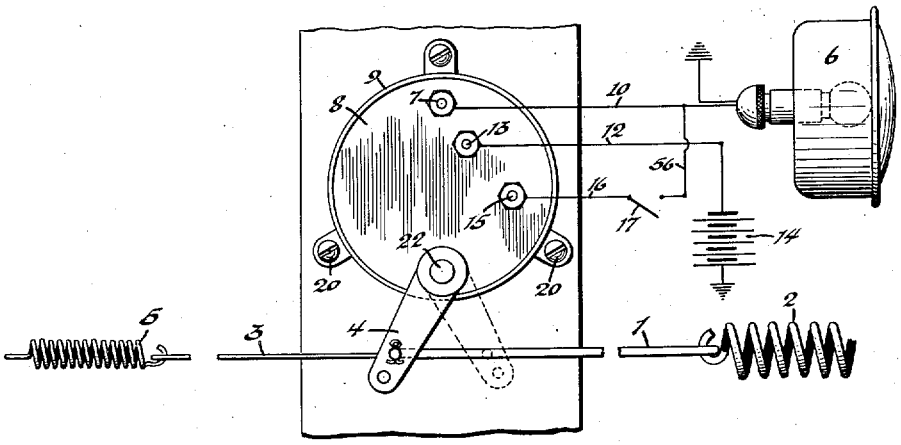
Fig. 1 is a diagram illustrating this current interrupter and the pedal and lamp connected thereto.

This interrupter is designed to be mounted on a board or other support 19 and the end 8 will usually be the top. Any desired means may be employed to swing the actuating arm 4, but this arm will usually be connected to a brake or clutch pedal of an automobile by a wire or rod 1, a strong spring 2 being connected into this rod for safety. The arm 4 may be returned to the normal position shown in Fig. 1 by a spring 5 which may be attached to a continuation 3 of this wire or rod 1.

The lamp 6 connects to the binding post 7 on the end 8 of the interrupter shell 9 by means of a wire 10. This end 8 is preferably of insulating material. A wire 12 connects the second post 13 to the battery 14 while a third post 15 is adapted to be connected to the wire 10 by means of the wire 16 and the switch 17. The shell 9 connects to a base 18 adapted to be attached to any desired support 19 by means of screws 20.

Figure 4:
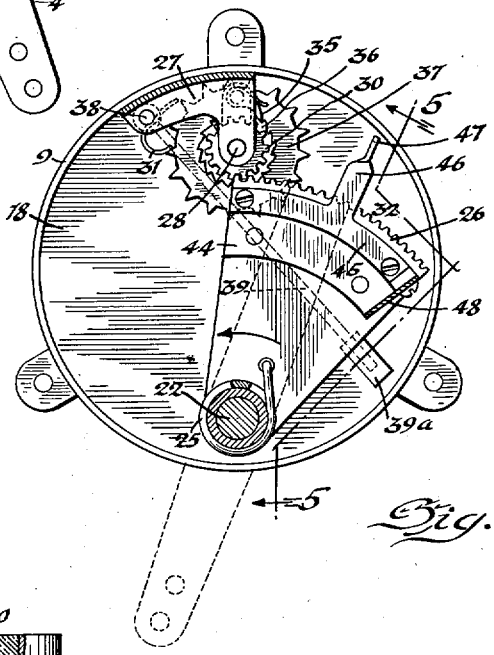

The crank arm 4 connects to a vertical shaft 22 to which is attached an arm 23. On this shaft is journalled a sleeve 24 which is connected to the arm 23 by means of a spring 25 so that when the crank arm 4 and the arm 23 are swung from full to dotted line positions in Fig. 3, the sleeve 24 and the sector 26 connected thereto will be moved in the direction of the arrow in Fig. 4.

Figure 2:
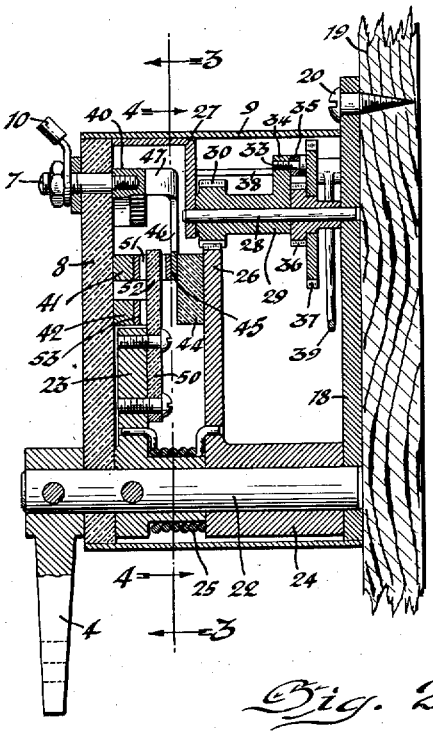
Fig. 2 is a vertical section of the interrupter.
Figure 5:
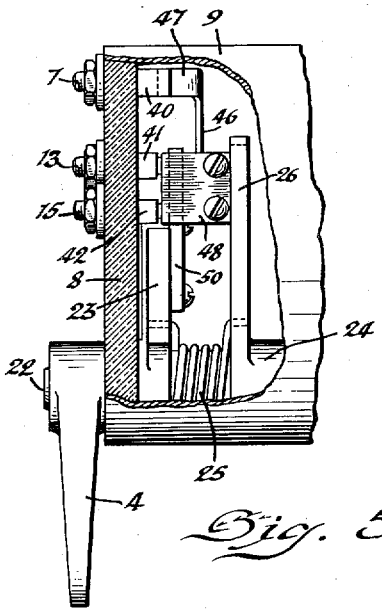
Fig. 5 is a section on the line 5—5 of Fig. 4.

A bracket 27 is attached to the shell 9 and carries one end of the shaft 28, the other end of the shaft being mounted in the base 18 as shown in Fig. 2. On this shaft is mounted a sleeve 29 having a pinion 30 at one end meshing with the teeth 32 on the sector 26 and also having an arm 33 which carries a pin 34 on which a pawl 35 is mounted. This pawl engages a ratchet wheel 36 which is united to an escapement wheel 37. Journaled in the bracket 27 and in the base 18 is an escapement shaft 38 to which is connected the pendulum 39 which may have a weight 39[a] at its lower end. This pendulum connects to the escapement 31 which engages the wheel 37 in the usual manner and permits the spring 25 to rotate the wheel 37 step by step. When, therefore, the arm 23 is swung to dotted line position in Fig. 3, the sector 26 will be pulled toward the left by the spring 25, the rate of its movement being determined by this escapement. The arm 23 and the sector are both preferably of metal.

Attached to the end 8 of the case are three circular contact segments 40, 41 and 42, connected to the binding posts 7, 13 and 15 respectively. The contacts 41 and 42 are smooth and entire, but the contact 40 is formed with grooves which are filled with small inserts 43 of insulating material. Secured to the sector 26 is a block 44 of insulating material which supports a plate 45 from which the arm 46 extends, and this arm carries a contact finger 47 which slides over the contact segment 40. Attached to one end of the block 44 is a contact plate 48 whose use will be explained hereafter.

Attached to the arm 23 is a plate 50 of insulation material to which are attached the outer double contact members having one arm or leaf 51 engaging the contact strip 41 and the other leaf 52 engaging the plate 45 on the sector 26, as shown in Fig. 6, and an inner single contact leaf 53 engaging the inner contact strip 42. The operation of this device is as follows:

*Operation*

When the parts are as shown in the drawings, the finger 47 is over a small insert 43 of insulation so that no current can pass to the wire 10 and the lamp. As soon as the arms 4 and 23 are swung, tension on the spring 25 causes the finger 47 to pass over the small metal strips 55 between the insulation insertions 43 and at each contact, current passes from the grounded battery 14 over wire 12, post 13 to contact strip 41, leaf contacts 51 and 52 to the plate 45, arm 46 and finger 47 to the contacts 55, post 7 and wire 10 to the lamp 6 and to ground. As the contact finger 47 passes over insulation inserts 43 and contacts 55 alternately, the lamp 6 will flash and extinguish, the rate depending on the pendulum 39.

When the switch 17 is closed, which it will be if the lamp 6 is to be normally ignited as at night, the current will pass from the battery to the segment 41 as before, then over the leaf contacts 51 and 52 to the plate 48, then to the inner leaf contact 53 as shown in Fig. 7 and to the segment 42, binding post 15, wire 16, switch 17 and wires 56 and 10 to the lamp, the end 57 of the leaf contact 53 being sufficiently long to bridge betwen the plate 48 and the segment 42. But as soon as the arms 4 and 23 are swung, the leaf contact 53 leaves the plate 48 and the lamp is extinguished and remains dark until it begins to flash by reason of the finger 47 passing over the small strips 55.

It will therefore be seen that when the switch 17 is closed, the lamp 6 is normally burning, but that when this switch is open, the lamp remains dark. But as soon as the arm 4 is swung, the lamp alternately flashes and extinguishes until the plate 48 catches up with the leaf contacts 51—52—53. If the arm 4 is moved slowly, the sector 26 may keep up with it and the flashes will be proportionately slow. When the arm 4 is released, both the arm 23 and the sector return to normal position at once, being permitted to do so by the pawl 35.

The details and proportions of the various parts of this signal may be changed by those skilled in the art without departing from the spirit of my invention as set forth in the following claims.

I claim:—

1. In a signal, the combination of a series of contact segments and electric conductors connected thereto, one of said segments having its contact face interrupted and being in the form of alternating conducting and non-conducting surfaces, a movable contact member adapted to slide over the interrupted contact face, means to regulate the rate of movement of said movable contact, manually movable means to actuate the movable contact, and additional contacts mounted on the manually movable means and adapted to engage the remainder of the contact segments and said movable contact member.

2. In a signal, the combination of a series of contact bars and electric conductors connected thereto, the contact face of one of said bars being interrupted by non-conducting areas, a movable contact adapted to slide over the interrupted contact face, a manually movable actuator, a spring connecting said actuator to the movable contact, an escapement to regulate the rate of movement of the movable contact, and a pair of contacts mounted on said actuator to electrically connect another of said contact bars and said movable contact.

3. In a signal, the combination of a shaft, means to turn the shaft back and forth through limited arcs, a series of contact segments concentric with the shaft, the contact face of one of said segments being interrupted by non-conducting areas, a movable contact plate rotatably mounted on the shaft and a finger on the plate slidable over the interrupted contact face, an actuating member connected to said shaft, a spring connecting said contact plate to said actuating member whereby the shaft may swing the contact plate, an escapement to control the rate of rotation of said contact plate, and electric conductors on the actuating member to electrically connect the contact plate and another segment.

4. In a signal, the combination of three contact bars and electric conductors connected thereto, the contact face of one of said bars being interrupted by non-conducting areas, a movable contact plate and a contact thereon adapted to slide over the interrupted contact face, a manually movable actuator, resilient means connecting the actuator to said movable contact, an escapement to control the rate of movement of the contact plate, a contact mounted on the actuator to electrically connect the contact plate to one of the contact bars when the actuators is in normal position, and additional means mounted on the actuator to electrically connect the contact plate to the third contact bar when the actuator has been moved from normal position.

5. In a signal, the combination of a contact bar having a contact face interrupted by non-conducting areas, a relatively movable contact member adapted to slide over the contact bar, an escapement to regulate the movement of said movable contact member over the bar, an electric conductor connected to said bar, a second electric conductor, means to electrically connect the second electric conductor to said movable contact member during such movement, a third electric conductor, and means for connecting the second conductor to the third when the movable contact member is at one end of its movement.

6. In a signal, the combination of stationary contact members and electric conductors connected thereto, one of said segments having its contact face interrupted, a movable contact carrier, contacts attached thereto adapted to slide over the stationary contact members, means to actuate the contact carrier, and means to regulate the rate of movement thereof.

7. In combination with a vehicle, an electric visual warning signal therefor, a movable element for controlling the progress of the vehicle, a circuit including the signal and a suitable source of electric energy, means actuated by movement of the control element for intermittently opening and closing the circuit to energize and deenergize the signal, and means for controlling said first named means to govern the frequency with which the circuit is opened and closed.

8. In combination with a vehicle, a visual warning signal therefor, a movable element for controlling the progress of the vehicle, an electric circuit including the signal and a suitable source of electric energy, means actuated by the control element when moved to intermittently open and close the circuit for an interval of time and thereafter maintain the circuit closed, and means for controlling said first named means to govern the frequency with which the circuit is opened and closed.

9. In combination with a vehicle, a visual warning signal therefor, a movable element for controlling the progress of the vehicle, a circuit including the signal and a suitable source of electric energy, power storage means connected to said control element and energized by movement of said control element, means actuated by the power stored in said first named means for opening and closing the circuit to said signal, and means for controlling said second means to govern the frequency with which the circuit is opened and closed.

10. In combination with a vehicle, a visual warning signal therefor, a movable element for controlling the progress of the vehicle, a circuit including said signal and a suitable source of electric energy, means controlled by the movable element when moved to intermittently open and close the circuit and means including an escapement mechanism for controlling said first named means to govern the frequency with which the circuit is opened and closed.

11. In a vehicle provided with a movable vehicle control element, an electrically operated visual warning signal, a battery, and a switching device in series with said battery and said signal and operable by said vehicle control element, two parallel circuit paths between said switching device and said signal, one of said paths including an intermittently operating signal flashing make and break device normally inoperative and including means which render it operable upon movement of said vehicle control element, the other of said paths including a normally closed switch device which opens upon movement of said vehicle control element and a manually and independently operated switch, the connections between the parts aforementioned being such that said signal is intermittently operated upon movement of said vehicle control element, and is steadily operative or steadily inoperative when said vehicle control element is not being moved.

12. In a vehicle provided with a movable vehicle control element, an electrically operated visual warning signal, a battery, and a switching device in series with said battery and said signal and operable by said vehicle control element, two parallel circuit paths between said switching device and said signal, one of said paths including an intermittently operating signal flashing make and break device normally inoperative and including means which render it operable upon movement of said vehicle control element, the other of said paths including a normally closed switch device which opens upon movement of said vehicle control element and a manually and independently operated switch, the connections between the parts aforementioned being such that said signal is intermittently operated upon movement of said vehicle control element, and is steadily operative or steadily inoperative when said vehicle control element is not being moved, said intermittently operating signal flashing make and break device being provided with a spring means for slowly expending the energy created with great rapidity by the movement of said vehicle control element.

13. In a vehicle provided with a movable vehicle control element, an electrically operated visual warning signal, a battery, and a switching device in series with said battery and said signal and operable by said vehicle control element, two parallel circuit paths between said switching device and said signal, one of said paths including an operating signal flashing make and break device normally inoperative and including means which render it operable upon movement of said vehicle control element, the other of said paths including a normally closed switch device which opens upon movement of said vehicle control element and a manually and independently operated switch, the connections between the parts aforementioned being such that said signal is intermittently operated upon movement of said vehicle control element, and is steadily operative or steadily inoperative when said vehicle control element is not being moved, said intermittently operating signal flashing make and break device being provided with a means for slowly expending the energy created with great rapidity by the movement of said vehicle control element, said means including a spring and an escapement device.

GEORGE JACOBS.